United States Patent
Mereddy

(10) Patent No.: US 12,199,852 B2
(45) Date of Patent: Jan. 14, 2025

(54) DETECTING A DATA RATE DECLINE IN A MULTICAST ADDRESS CHANNEL

(71) Applicant: Charter Communications Operating, LLC, St. Louis, MO (US)

(72) Inventor: Sandeep Reddy Mereddy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 120 days.

(21) Appl. No.: 18/184,955

(22) Filed: Mar. 16, 2023

(65) Prior Publication Data
US 2024/0314055 A1    Sep. 19, 2024

(51) Int. Cl.
| H04L 43/16 | (2022.01) |
| H04L 12/18 | (2006.01) |
| H04L 43/0894 | (2022.01) |

(52) U.S. Cl.
CPC .......... *H04L 43/16* (2013.01); *H04L 12/1827* (2013.01); *H04L 43/0894* (2013.01)

(58) Field of Classification Search
CPC ................................. H04L 43/16; H04L 12/18
USPC ........................................................ 709/224
See application file for complete search history.

(56) References Cited

FOREIGN PATENT DOCUMENTS

| CN | 100420239 C | * | 9/2008 | |
| CN | 102017491 B | * | 9/2014 | ............ H03M 13/25 |

* cited by examiner

*Primary Examiner* — Sibte H Bukhari
(74) *Attorney, Agent, or Firm* — Dority & Manning, P.A.

(57) ABSTRACT

Channel information is accessed that identifies a plurality of channels, and for each channel a multicast address to which packets carrying channel content are addressed. Multicast data rate information is obtained from a plurality of routers that identifies, for each respective router, a real-time data rate of data addressed to a multicast address being routed by the respective router. It is determined, based on the multicast data rate information, that an output channel data rate of a first channel of the plurality of channels is lower than an expected output channel data rate that corresponds to the first channel. Information indicating that the first channel has an output channel data rate that is less than the expected output channel data rate is presented on a display device.

20 Claims, 9 Drawing Sheets

DETECTING A DATA RATE DECLINE IN A MULTICAST ADDRESS CHANNEL

BACKGROUND

Entities, such as national service providers, provide video and audio channels to subscribers via a complex network of routers that may be geographically dispersed across a large geographic area.

SUMMARY

The embodiments disclosed herein implement mechanisms for detecting a data rate decline in a multicast address channel.

In one embodiment a method is provided. The method includes accessing, by a computing device comprising a processor device, channel information that identifies a plurality of channels, and for each channel a multicast address to which packets carrying channel content are addressed. The method further includes obtaining, by the computing device from a plurality of routers, multicast data rate information that identifies, for each respective router, a real-time data rate of data addressed to a multicast address being routed by the respective router. The method further includes determining, by the computing device based on the multicast data rate information, that an output channel data rate of a first channel of the plurality of channels is lower than an expected output channel data rate that corresponds to the first channel. The method further includes presenting, on a display device, information indicating that the first channel has an output channel data rate that is less than the expected output channel data rate.

In another embodiment a computing device is provided. The computing device includes a memory, and a processor device coupled to the memory. The processor device is configured to access channel information that identifies a plurality of channels, and for each channel a multicast address to which packets carrying channel content are addressed. The processor device is further configured to obtain, from a plurality of routers, multicast data rate information that identifies, for each respective router, a real-time data rate of data addressed to a multicast address being routed by the respective router. The processor device is further configured to determine, based on the multicast data rate information, that an output channel data rate of a first channel of the plurality of channels is lower than an expected output channel data rate that corresponds to the first channel. The processor device is further configured to present, on a display device, information indicating that the first channel has an output channel data rate that is less than the expected output channel data rate.

In another embodiment a non-transitory computer-readable storage medium is provided. The non-transitory computer-readable storage medium includes executable instructions configured to cause a processor device to access channel information that identifies a plurality of channels, and for each channel a multicast address to which packets carrying channel content are addressed. The instructions further cause the processor device to obtain, from a plurality of routers, multicast data rate information that identifies, for each respective router, a real-time data rate of data addressed to a multicast address being routed by the respective router. The instructions further cause the processor device to determine, based on the multicast data rate information, that an output channel data rate of a first channel of the plurality of channels is lower than an expected output channel data rate that corresponds to the first channel. The instructions further cause the processor device to present, on a display device, information indicating that the first channel has an output channel data rate that is less than the expected output channel data rate.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
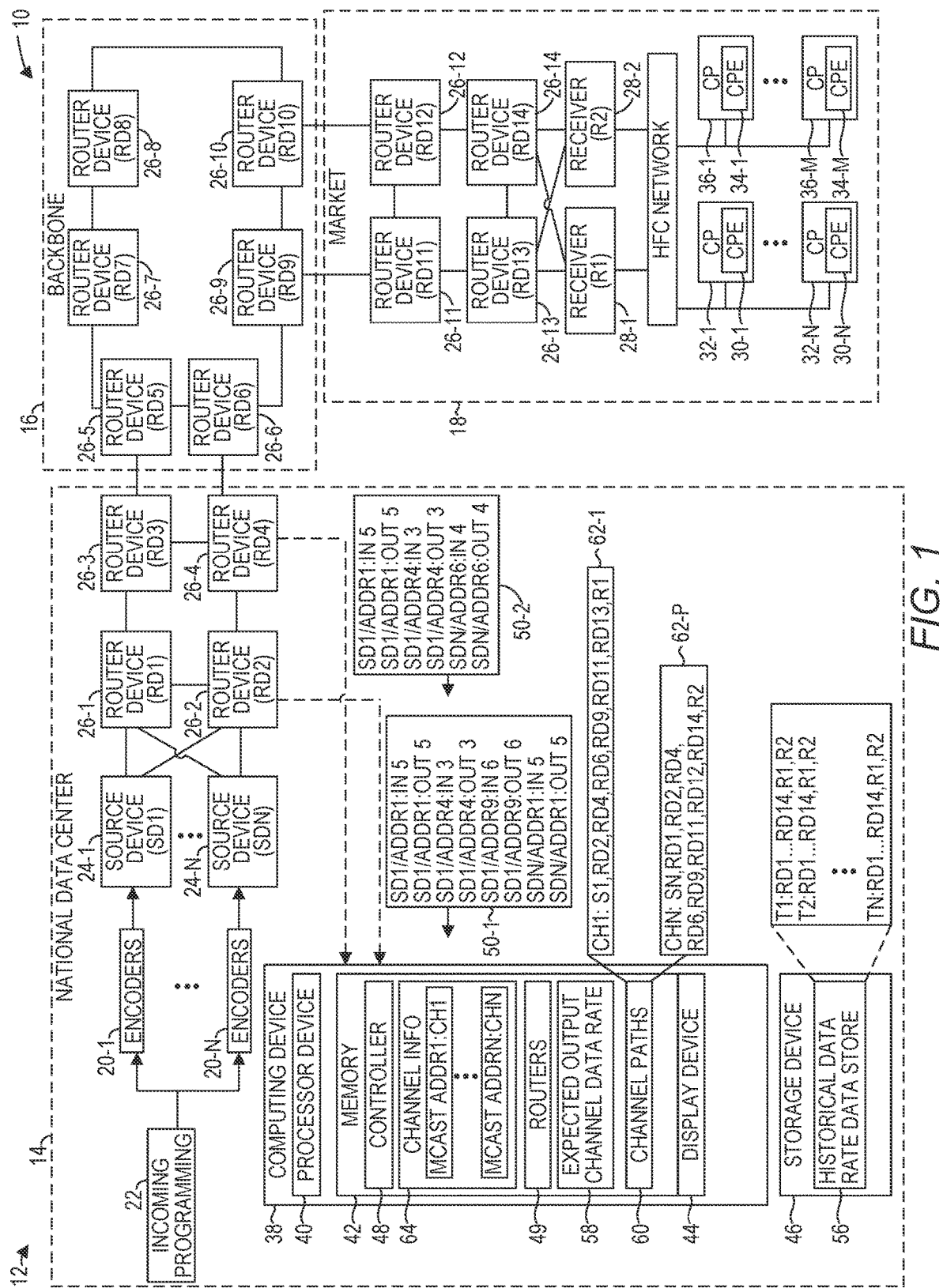
FIG. 1 is a block diagram of an environment suitable for detecting a data rate decline in a multicast address channel according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Entities, such as national service providers, provide video and audio channels (hereinafter "channels" for the sake of brevity) to subscribers via a complex network of routers that may be geographically dispersed across a large geographic area. Specifically, a source device originates a channel by transmitting a stream of packets to a multicast address. To receive the stream of packets, a receiver device joins the multicast group using, for example, an Internet Group Management Protocol (IGMP) join message. Hundreds or thousands of receivers may join a multicast group that receives the stream of packets addressed to the particular multicast address.

A service provider may have thousands of routers that distribute channels to subscribers over a vast geographic area. When a subscriber contacts the service provider to inform the service provider that the subscriber is suffering a video or audio quality issue with a channel, such as either poor resolution, jitter, a decline in audio or video, or no audio or video at all, a technician attempts to determine where the problem originates so that the problem can be resolved. Because of the large number of routers in the network, this can be a time-consuming challenge, and lead to customer dissatisfaction if the problem is not rapidly resolved. It would be preferable if the technician could quickly identify where the problem exists. Additionally, it would be preferable if the network could be monitored automatically on a continuous basis and generate information identifying a problem perhaps even before the problem becomes severe enough for customers to contact the service provider.

The embodiments disclosed herein implement mechanisms for detecting a data rate decline in a multicast address channel. Multicast data rate information is obtained from a plurality of routers that route media packets transmitted to a multicast address. The multicast data rate information includes, for each router, a real-time data rate of data being routed by the respective router for each multicast address being routed by the router. Based on the multicast data rate information it is determined that an output channel data rate of a channel is lower than an expected output channel data rate that corresponds to the channel, and information is presented on a display device that indicates that the channel has an output channel data rate that is less than the expected output channel data rate.

FIG. 1 is a block diagram of an environment 10 in which embodiments disclosed herein may be practiced. The environment 10 includes a service provider network 12 that is organized into a national data center 14, a backbone 16 and a market 18. While for purposes of illustration only one national data center 14, one backbone 16 and one market 18 is illustrated, in practice the service provider network 12 may have multiple national data centers 14, backbones 16 and markets 18. In some embodiments each market 18 corresponds to a particular geographic area, and the service provider network 12 may have hundreds of markets 18.

The national data center 14 includes a plurality of encoders 20-1-20-N that receives incoming programming 22 and encodes the incoming programming 22 for distribution to subscribers. The encoding may include, for example, compressing the incoming programming 22, formatting the incoming programming 22 into a particular format, or formats, and the like. The incoming programming 22 may originate from content creators, such as traditional broadcast companies, private streaming companies, and the like.

The national data center 14 includes a plurality of source devices 24-1-24-N (generally, source devices 24). The source device 24-1 originates one or more channels by transmitting a series of packets generated by an encoder 20 to a multicast address (sometimes referred to as a multicast group or multicast group address).

The source device 24-1 transmits the packets associated with a channel at a particular data rate, which may be quantified in any number of way, including, by way of non-limiting example, bits per second, megabits per second, or packets per second when the packets are substantially fixed size. Because the source device 24-1 transmits the packets at a particular data rate, each router that routes the multicast address preferable receives incoming packets addressed to the multicast address at substantially the same data rate and sends outgoing packets addressed to the multicast address at substantially the same data rate. Each source device 24-1 may originate a plurality of different channels, and different source devices 24 may originate the same channel for redundancy purposes.

Packets addressed to a multicast address traverse one or more of a plurality of router devices 26-1-26-14 (generally, routers 26) in the service provider network 14. Each router 26 may route any number of multicast addresses. The phrase "route a multicast address" refers to routing packets addressed to a multicast address. The routers 26 maintain data rate information that identifies, for each pair of a source and multicast address, an incoming data rate and an outgoing data rate. It is noted that only 14 routers 26 are illustrated, however, in practice, the service provider network 12 may include hundreds or thousands of routers 26.

The backbone 16 comprises a plurality of routers 26-5-26-10 that provide packets to a plurality of different markets, such as the market 18. The backbone 16 also provides redundancy in the event of a communications medium mishap, such as a severed fiber cable, or a router failure. The routers 26-5-26-10 may be long distances from one another. The backbone 16 is coupled to a plurality of routers 26-11-26-12 in the market 18. The market 18 serves a particular geographic area and includes routers 26-11-26-14. The market 18 includes receivers 28-1 and 28-2 (generally, receivers 28) that serve a plurality of CPEs 30-1-30-N located in customer premises 32-1-32-N, and a plurality of CPEs 34-1-34-M located in customer premises 36-1-36-M.

The receivers 28 are devices that issue a multicast join message to a particular multicast address, such as an IGMP join message, to receive a channel that corresponds to that multicast address. In some embodiments, the receivers 28 may comprise cable modem termination systems (CMTSs), edge quadrature amplitude modulation (QAM) devices which modulate an MPEG data stream for an RF frequency, or ad insertion devices which splice ads into an MPEG data stream.

The service provider network 12 includes a computing device 38, which in turn includes a processor device 40, a memory 42 and a display device 44. The computing device 38 may include or be communicatively coupled to a storage device 46. The computing device 38 includes a controller 48 that may implement some or all of the processing disclosed herein. The computing device 38 maintains channel information 64 that identifies a plurality of channels, and for each channel a multicast address to which packets carrying channel content are addressed.

The controller 48 obtains, from each of the routers 26, multicast data rate information that identifies, for each respective router 26, a real-time data rate of data being routed by the respective router 26 for each multicast address being routed by the respective router 26. In embodiments where multiple sources 24 may be transmitting to the same multicast address for purposes of redundancy, each router 26 may provide the multicast data rate information on a basis of source device 24 and multicast address (e.g., source device 24/multicast address), sometimes referred to as a source/group, or (S,G). For example, the source device 24-1 may be originating a channel 1 to a multicast address ADDR1 that is routed by the router 26-1, and the source device 24-N, for purposes of redundancy, may also be originating the channel 1 to the multicast address ADDR1 that is routed by the router 26-1. The router 26-1 provides multicast data rate information for the flow of packets associated with the source device 24-1, and separately for the flow of packets associated with the source device 24-N, even though the packets may be directed to the same multicast address.

In some embodiments the controller 48 may maintain a data structure 49 that contains address information for each router 26, such as an IP address, and obtains the multicast data rate information by periodically sending requests to each router 26 for the multicast data rate information. The controller 48 may obtain the information at any desired interval, such as every 500 milliseconds, every one second, every two seconds, or the like. In other embodiments each router 26 includes a telemetry agent that periodically provides the multicast data rate information to the controller 48. The controller 48 may also obtain multicast data rate information from each source device 24 and receiver 28.

The multicast data rate information provides incoming data rates and outgoing data rates in terms of a desired metric, such as, by way of non-limiting example, bits per second, megabits per second, or packets per second when the packets associated with a particular channel are a fixed size. As an example, the router 26-2 sends multicast data rate information 50-1 that indicates, at the instant in time that the router 26-2 sends the multicast data rate information 50-1, the router 26-2 was receiving packets originating from the source device 24-1 (SD1) destined for the multicast address ADDR1 at an incoming data rate of 5 packets per second and transmitting the packets to a downstream router 26 (e.g., the router 26-1 or 26-4) at an outgoing data rate of 5 packets per second. The multicast data rate information 50-1 indicates that the router 26-2 was receiving packets originating from the source device 24-1 destined for the multicast address ADDR4 at a rate of 3 packets per second and transmitting the packets to a downstream router 26 at a rate of 3 packets per second. The multicast data rate information 50-1 indicates that the router 26-2 was receiving packets originating from the source device 24-1 destined for the multicast address ADDR9 at a rate of 6 packets per second and transmitting the packets to a downstream router 26 at a rate of 6 packets per second. The multicast data rate information 50-1 indicates that the router 26-2 was receiving packets originating from the source device 24-N (SDN) destined for the multicast address ADDR1 at a rate of 5 packets per second and transmitting the packets to a downstream router 26 at a rate of 5 packets per second.

The router 26-4 sends multicast data rate information 50-2 that indicates, at the instant in time that the router 26-4 sends the multicast data rate information 50-2, the router 26-4 was receiving packets originating from the source device 24-1 destined for the multicast address ADDR1 at a rate of 5 packets per second and transmitting the packets to a downstream router 26 at a rate of 5 packets per second. The multicast data rate information 50-2 indicates that the router 26-4 was receiving packets originating from the source device 24-1 destined for the multicast address ADDR4 at a rate of 3 packets per second and transmitting the packets to a downstream router 26 at a rate of 3 packets per second. The multicast data rate information 50-2 indicates that the router 26-4 was receiving packets originating from the source device 24-N destined for the multicast address ADDR6 at a rate of 4 packets per second and transmitting the packets to a downstream router 26 at a rate of 4 packets per second. In some embodiments, the controller 48 may also receive multicast data rate information from the receivers 28. The controller 48 may store the multicast data rate information received from the routers 26, along with a timestamp, in an historical data rate data store 56 to facilitate determining what the multicast data rate was for any particular router 26 and for any source device 24/multicast address pair at previous instances in time. The multicast data rate information 50 may also include, for each multicast address, the IP address of the upstream router 26 that is sending the packets to the router 26, and the IP address of the downstream router 26 (or receiver 28) to which the router 26 is sending the packets.

The controller 48 may maintain expected output channel data rate information 58 that identifies, for each channel, an expected output channel data rate. The expected output channel data rate information 58 may be generated based on an historical output channel data rate or based on predetermined output channel data rate information. In one embodiment the actual output channel data rate for each channel over a previous period of time may be used to train a machine learning model (MLM) to predict an expected output channel data rate information for the channel. The controller 48 may then subsequently query the MLM to determine if the actual output channel date rate is lower than the expected output channel data rate.

The controller 48 may also maintain channel path information 60 that identifies, for each source/multicast address pair, the path of the channel through a set of routers 26 of the plurality of routers 26. As an example, an entry 62-1 indicates that the path of the channel "CH1" originating from the source device 24-1 and ending at the receiver 28-1 (R1) traverses the routers 26-2 (RD2), 26-4 (RD4), 26-6 (RD6), 26-9 (RD9), 26-11 (RD11), and 26-13 (RD13). An entry 62-P indicates that the path of the channel "CHN" originating from the source device 24-N and ending at the receiver 28-2 (R2) traverses the routers 26-1 (RD1), 26-2 (RD2), 26-4 (RD4), 26-6 (RD6), 26-9 (RD9), 26-11 (RD11), 26-12 (RD12), and 26-14 (RD14). The channel path information 60 may be predetermined, or the controller 48 may generate the channel path information 60 based on the multicast data rate information received from the routers 26 and receivers 28 by matching input and output multicast address information.

The controller 48, based on the multicast data rate information received from the routers 26, determines if the output channel data rate associated with a channel, at any router 26, is lower than the expected output channel data rate. Typically, if the output channel data rate associated with a channel is lower at any router 26, the output channel data rate will be lower at each downstream router 26 in the path of routers 26 between a source device 24 and a receiver 28 that the packets for a channel traverse.

If the output channel data rate associated with a channel is lower than the expected output channel data rate, the controller 48 causes the presentation of information on the display device 44 indicating that the channel has an output channel data rate that is less than the expected output channel data rate.

It is noted that, because the controller 48 is a component of the computing device 38, functionality implemented by the controller 48 may be attributed to the computing device 38 generally. Moreover, in examples where the controller 48 comprises software instructions that program the processor device 40 to carry out functionality discussed herein, functionality implemented by the controller 48 may be attributed herein to the processor device 40.

Figure 2:
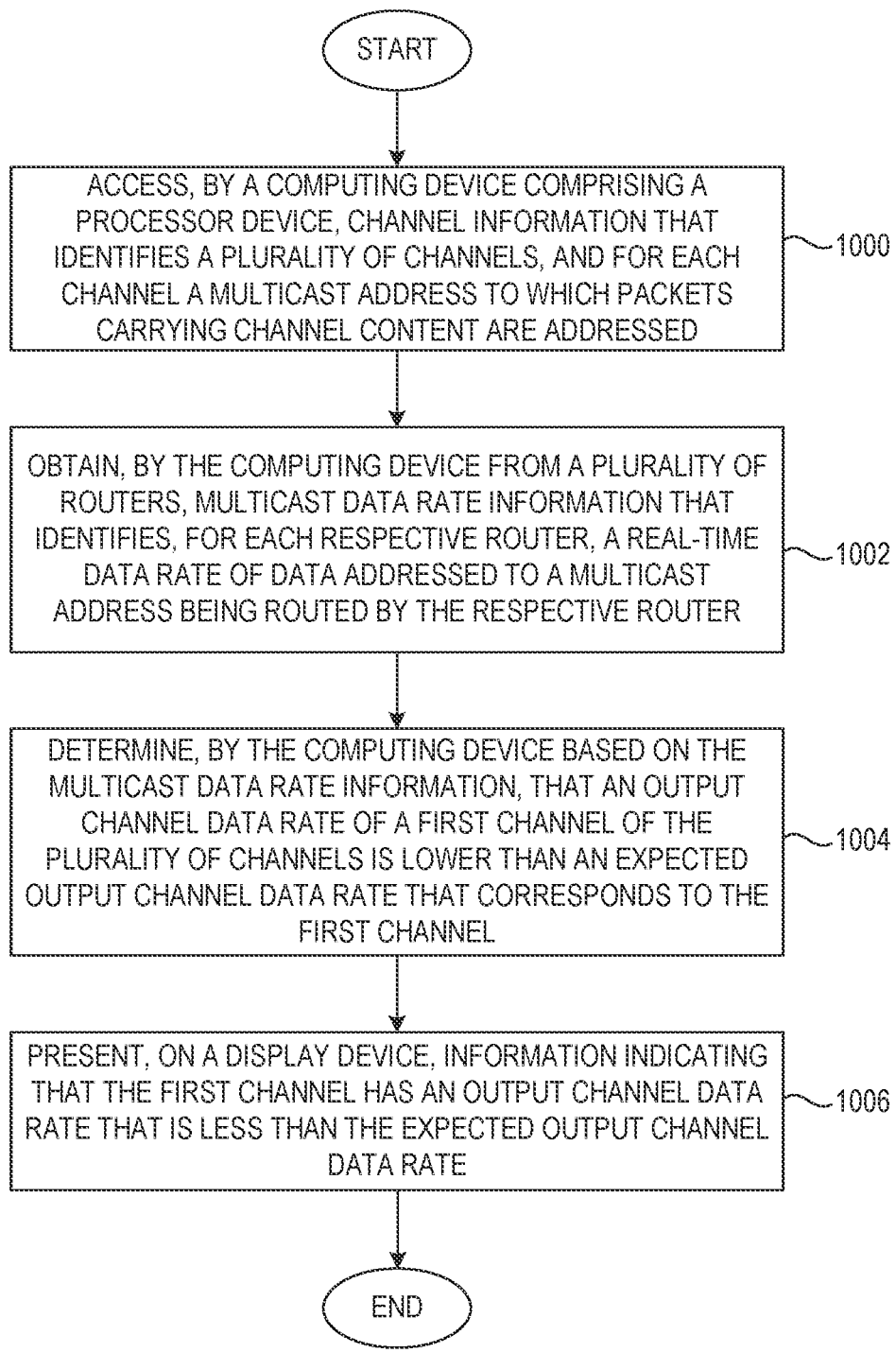
FIG. 2 is a flowchart of a method for detecting a data rate decline problem in a multicast address channel according to one embodiment.

FIG. 2 is a flowchart of a method for detecting a data rate decline in a multicast address channel according to one embodiment. FIG. 2 will be discussed in conjunction with FIG. 1. The computing device 38 accesses the channel information 64 that identifies the plurality of channels, and for each channel the multicast address to which packets carrying channel content are addressed (FIG. 2, block 1000). The computing device 38 obtains, from the plurality of routers 26, the multicast data rate information 50 that identifies, for each respective router 26, the real-time data rate of data addressed to a multicast address being routed by the respective router (FIG. 2, block 1002). The computing device 38 determines, based on the multicast data rate information 50, that an output channel data rate of a first channel of the plurality of channels is lower than an expected output channel data rate that corresponds to the first channel (FIG. 2, block 1004). The computing device 38 presents, on the display device 44, information indicating that the first channel has an output channel data rate that is less than the expected output channel data rate (FIG. 2, block 1006).

Figure 3A:
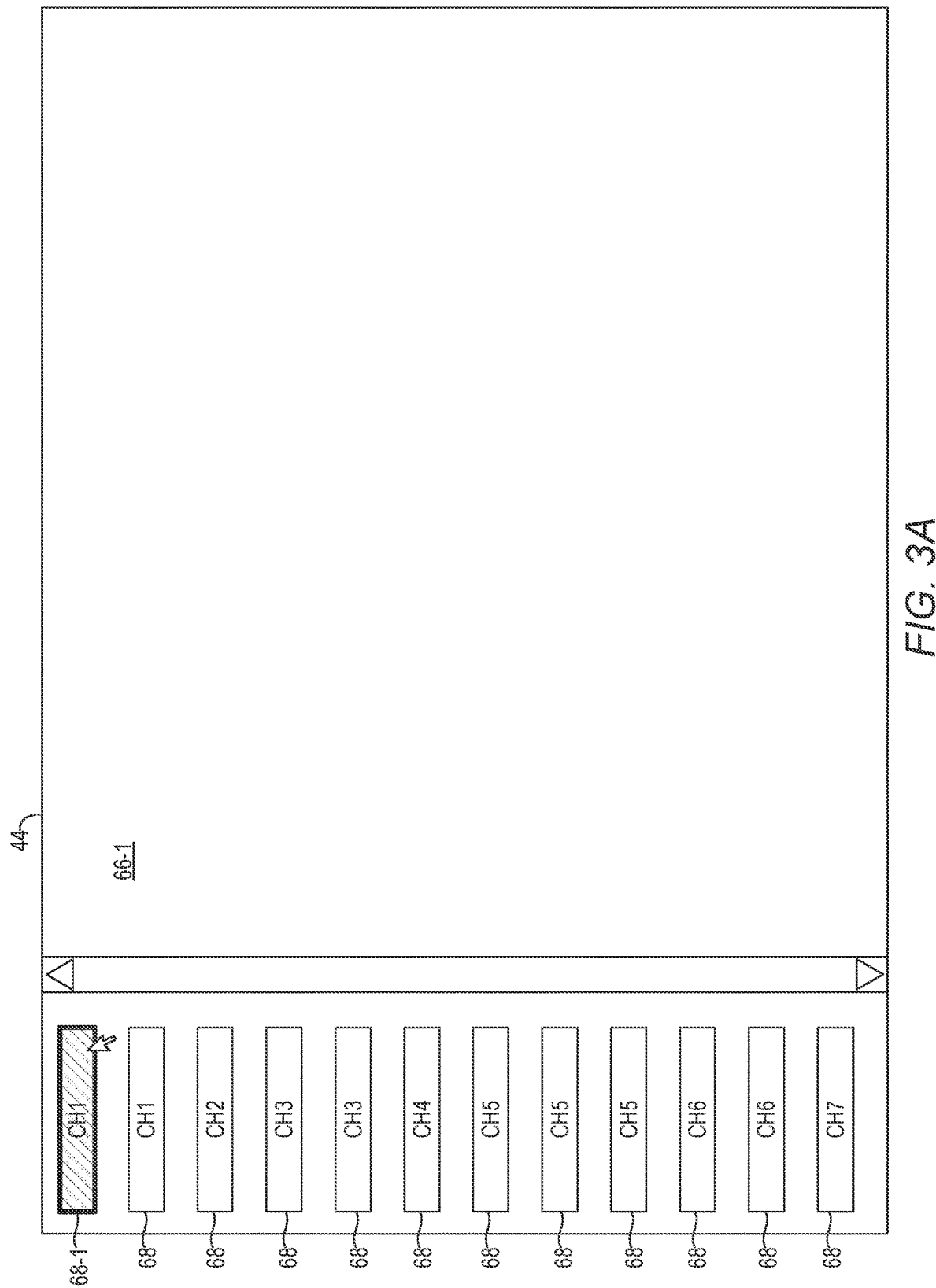
FIGS. 3A-3C illustrate a user interface that may be presented on a display device in response to detecting a data rate decline in a multicast address channel according to some embodiments.
Figure 3B:
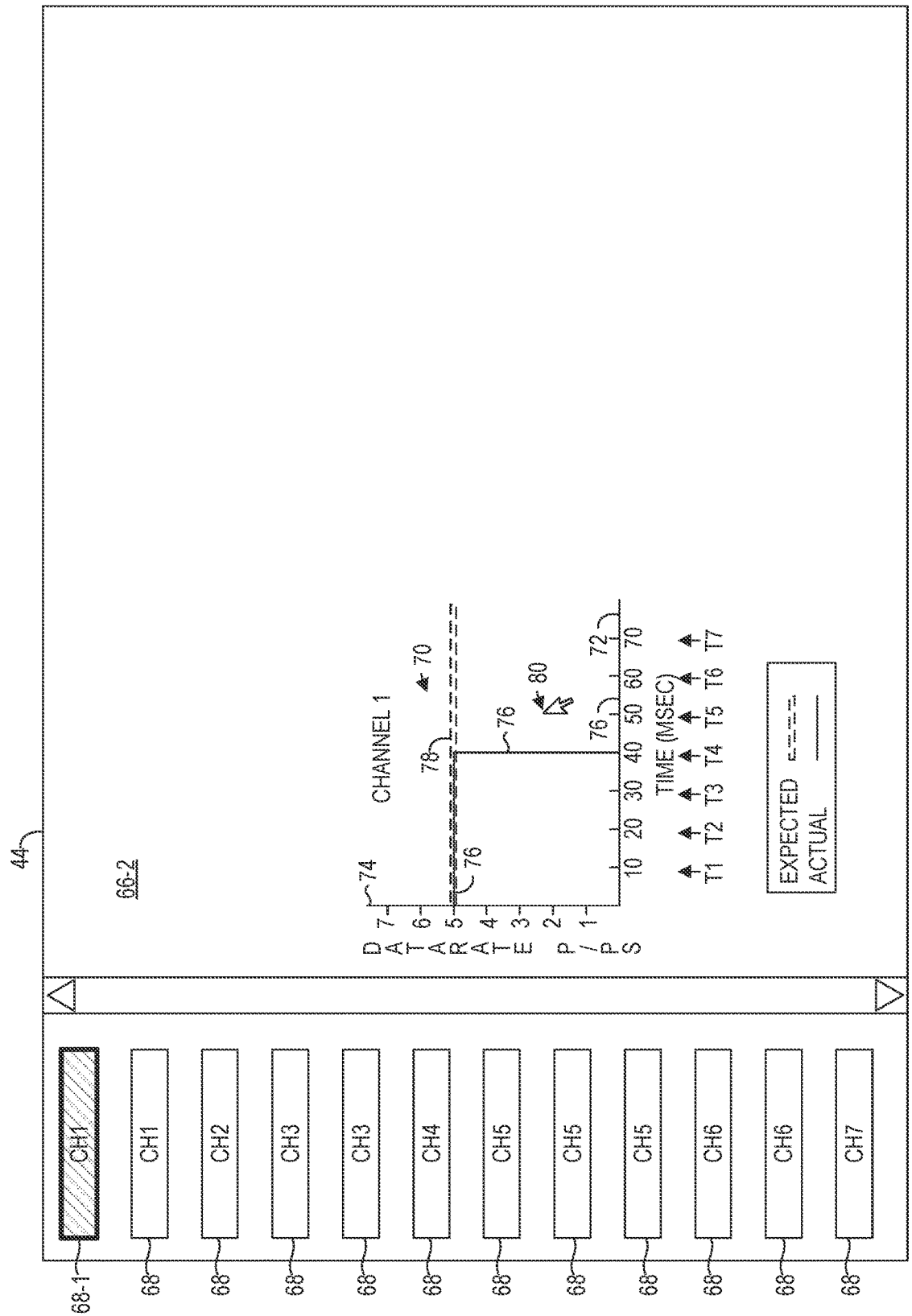
Figure 3C:
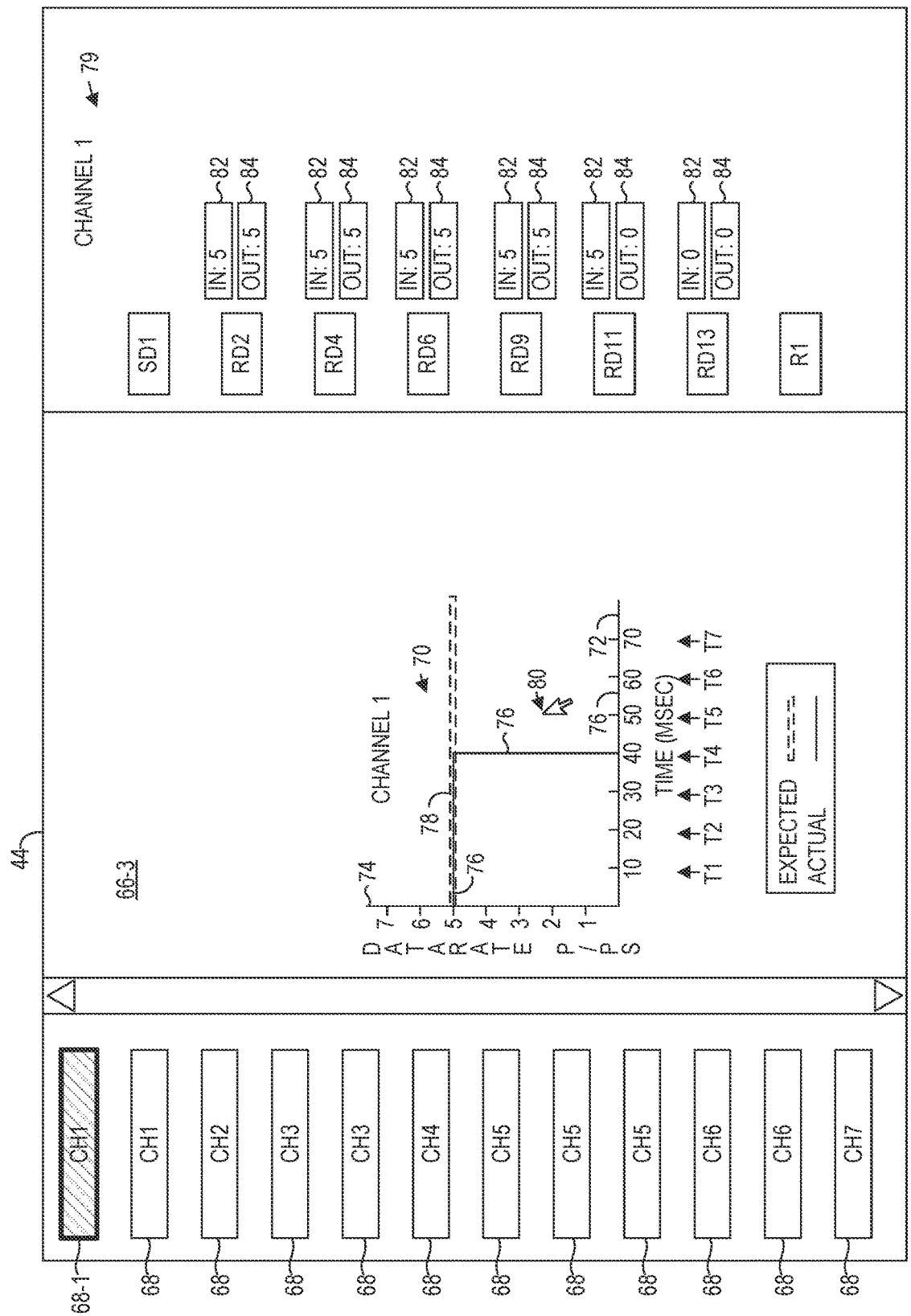

FIGS. 3A-3C illustrate a user interface that may be presented on a display device in response to detecting a data rate problem in a multicast address channel according to some embodiments. The controller 48 generates user interface imagery 66-1 that comprises a plurality of selectable channel controls 68, 68-1 (generally, channel controls 68), each channel control 68 corresponding to a particular source device/multicast address pair that implements a channel and comprising information that identifies the channel to which the channel control 68 corresponds. In this example the information that identifies the channel is a channel identifier, such as "CH1" and "CH2". In practice such channel identifiers may identify actual broadcast channels such as "LIFETIME", "ESPN", or the like. Note that in an environment where the same channel may be originated from multiple source devices 24, there may be multiple channel controls 68 that correspond to the same channel.

In this example, the controller 48 determined, based on the multicast data rate information 50, that the output channel data rate of the channel (e.g., CH1) corresponding to the multicast address ADDR1 is lower than an expected output channel data rate that corresponds to the channel CH1. In response, the controller 48 alters a visual characteristic of the channel control 68-1 that corresponds to the channel CH1 to have a different visual characteristic than that of each other channel control 68. The different visual characteristic may be any visual characteristic that is different from a uniform visual characteristic that each channel control 68 has, such as a thicker border, a different background color, a flashing channel control, additional text indicating a problem with the channel CH1, or the like. The controller 48 presents the user interface imagery 66-1 on the display device 44. In this example due to the number of channels, the user interface imagery 66-1 is scrollable. Each channel control 68 can be selected by an operator to obtain information about the channel, as will be discussed in greater detail below.

In this example, in response to seeing that the channel control 68-1 has the different visual characteristic than each other channel control 68, an operator selects the channel control 68-1. Referring now to FIG. 1B, in response to receiving the user input selection of the channel control 68-1, the controller 68 presents, on the display device 44, user interface imagery 66-2 that supplements the user interface imagery 66-1, and identifies the output channel data rate of the channel CH1 over a period of time and the expected output channel data rate of the channel CH1. In particular, the controller 48 accesses the channel path information 60 to determine the path through the set of routers 26 that a packet having the multicast address ADDR1 that corresponds to the channel CH1 is routed from the source device 24-1 to the receiver device 62-1.

The controller 48 accesses, from the historical data rate data store 56, the multicast data rate information obtained iteratively over a period of time from the set of routers 26. The controller 48 generates the user interface imagery 66-2 based on the multicast data rate information. The user interface imagery 66-2 identifies the output channel data rate of the channel CH1 at a plurality of instances of time T1, T2, T3, T4, T5, T6 and T7.

In particular, in this embodiment, the user interface imagery 66-2 includes a graph 70 having an x-axis 72 of time that encompasses the plurality of instances in time T1, T2, T3, T4, T5, T6 and T7, and having a y-axis 74 of data rate, which in this example is in terms of packets per second (P/PS). The user interface imagery 66-2 indicates the output channel data rate of the channel CH1 by a solid line 76 on the graph 70, and indicates the expected output channel data rate of the channel CH1 by a dashed line 78. In this example, the output channel data rate of the channel CH1 was 5 P/PS for a period of time and then dropped to 0 P/PS, and the expected output channel data rate is 5 P/PS.

The graph 70 is user selectable, and the operator selects a location 80 on the graph where the output channel data rate of the channel CH1 is 0 P/PS. The controller 48 receives the user input selection and correlates the location 80 of the user input selection to a particular instant of time on the X-axis 72 of the graph 70. Referring now to FIG. 3C, the controller 48 accesses the historical data rate data store 56 and generates, based on the multicast data rate information in the historical data rate data store 56, user interface imagery 66-3. The user interface imagery 66-3 supplements the user interface imagery 66-1 and 66-2 and comprises information 79 that identifies the path through the routers 26 in the set of routers 26 from the source device 24-1 to the receiver 28-1 and, for each respective router 26 in the set of routers 26, an incoming data rate 82 associated with the multicast address corresponding to the channel CH1 and an outgoing data rate 84 associated with the multicast address corresponding to the channel CH1 at the particular instant in time.

In this example, the router RD11 (i.e., the router 26-11) is no longer outputting packets addressed to the multicast address ADDR1 and thus at the router 26-11 and each subsequent router 26 in the path the output channel data rate of the channel CH1 is 0 P/PS.

It is noted that, while a particular sequence of user interface imagery has been illustrated, the embodiments are not limited to any particular sequence of user interface imagery. In particular, as discussed above, when the controller 48 determines, based on the multicast data rate information 50, that the output channel data rate of the channel CH1 is lower than the expected output channel data rate that corresponds to the channel CH1, the controller 48 presents, on the display device 44, information indicating that the channel CH1 has the unexpected output channel data rate. In the example of FIGS. 1A-1C, the information indicating that the channel CH1 has the unexpected output channel data rate comprised the channel controls 68 and the visually distinguishing feature associated with the channel control 68-1. However, in other embodiments, the information indicating that the channel CH1 has an unexpected output channel data rate may comprise the graph 70 which also indicates that the channel CH1 has the unexpected output channel data rate. In yet other embodiments, the information indicating that the channel CH1 has an unexpected output channel data rate may comprise the information 79 that identifies the path through the routers 26 in the set of routers 26 from the source device 24-1 to the receiver 28-1 and, for each respective router 26 in the set of routers 26, an incoming data rate 82 associated with the multicast address corresponding to the channel CH1 and an outgoing data rate 84 associated with the multicast address corresponding to the channel CH1 at the particular instant in time.

Figure 4A:
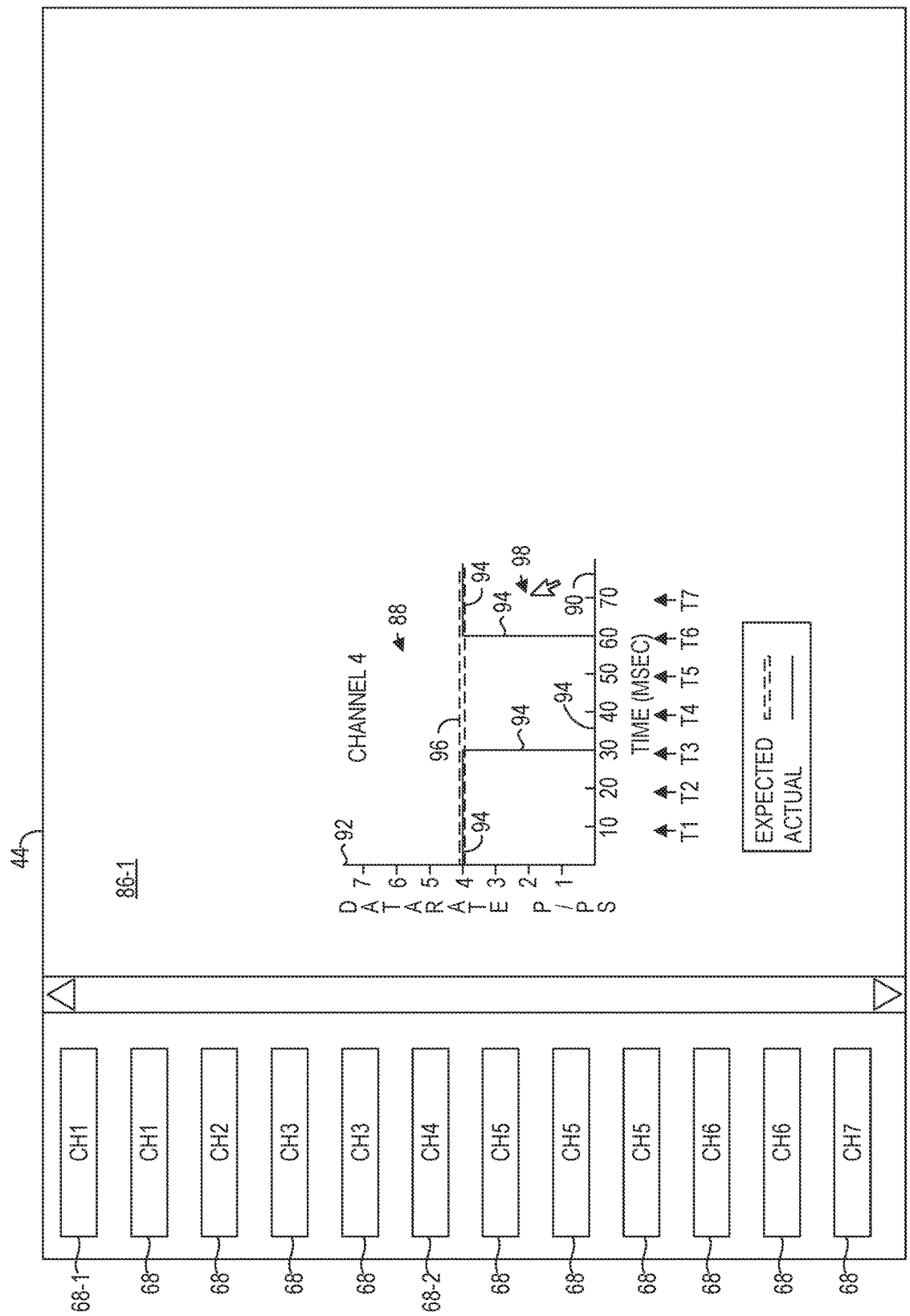
FIGS. 4A-4C illustrate another user interface that may be presented on a display device in response to input from an operator.
Figure 4B:
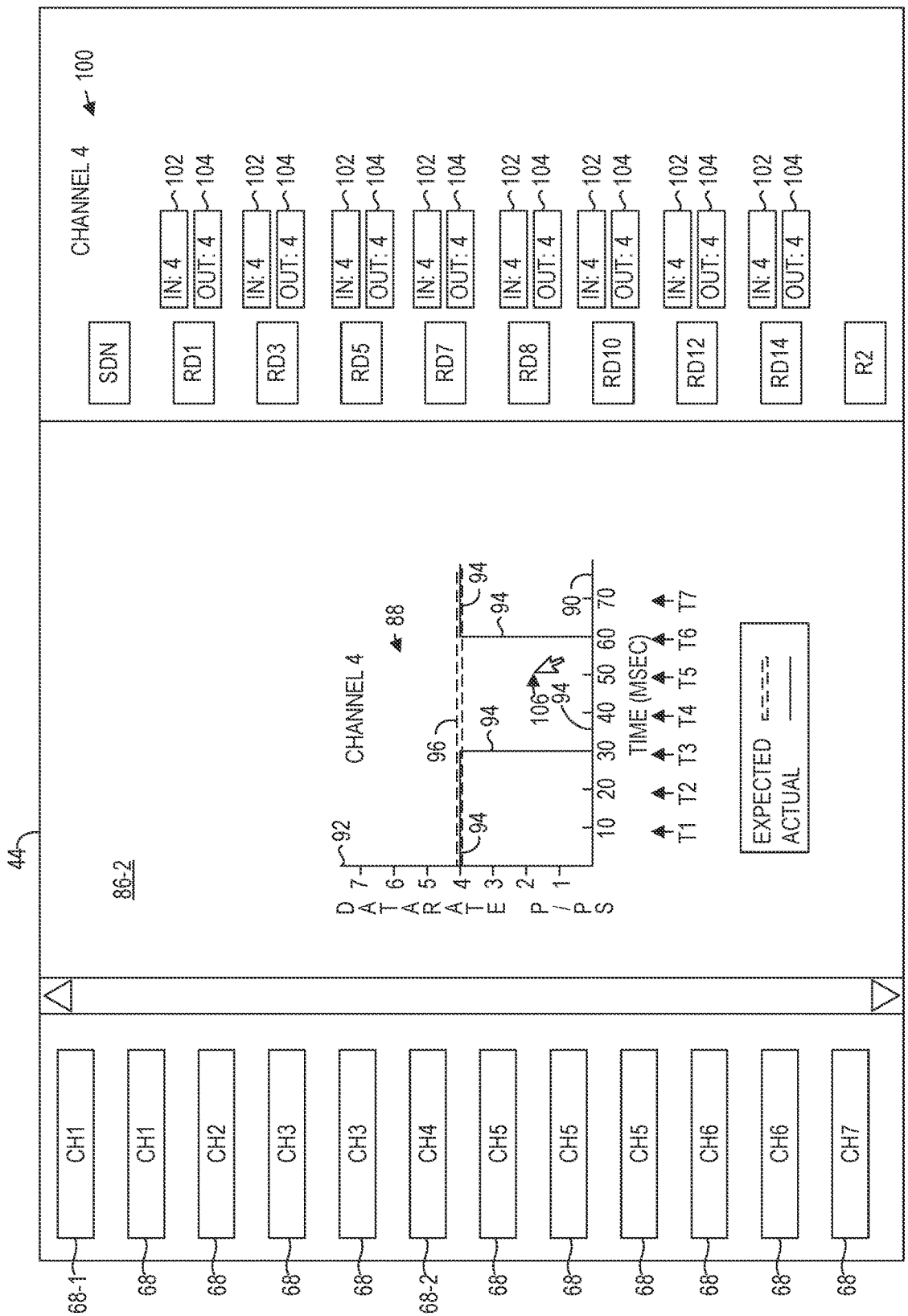
Figure 4C:
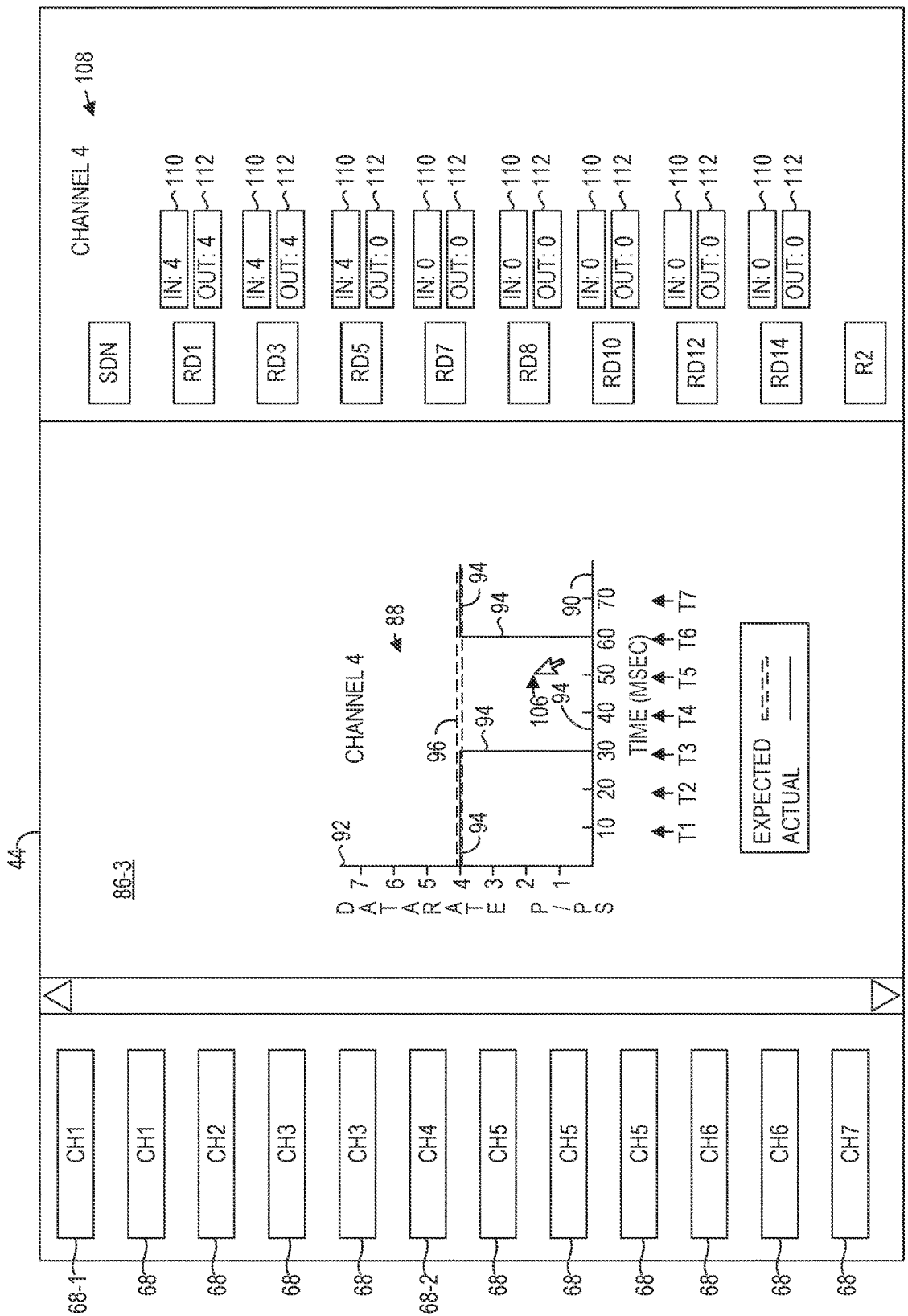

FIGS. 4A-4C illustrate another user interface that may be presented on the display device 44 in response to input from an operator. In this example, the operator has received information, such as via a customer complaint, regarding a channel CH4. Although the channel control 68-2 does not contain a visually distinguishing characteristic, the operator selects the channel control 68-2. In response, the controller 48 accesses the channel path information 60 and determines that a packet associated with the channel CH4 originates with the source device 24-N, traverses a path of the routers 26-1, 26-3, 26-5, 26-7, 26-8, 26-10, 26-12, 26-14 to the receiver 28-2. The controller 48 accesses the channel information 64 to determine that the multicast address corresponding to the CH4 is ADDR7. The controller 48 accesses, from the historical data rate data store 56, the multicast data rate information obtained iteratively over a period of time from the set of routers 26. The controller 48 generates user interface imagery 86-1 based on the multicast data rate information. The user interface imagery 86-1 identifies the output channel data rate of the channel CH4 at a plurality of instances of time T1, T2, T3, T4, T5, T6 and T7.

In particular, the user interface imagery 86-1 includes a graph 88 having an x-axis 90 of time that encompasses the plurality of instances in time T1, T2, T3, T4, T5, T6 and T7, and having a y-axis 92 of data rate, which in this example is in terms of P/PS. The user interface imagery 86-1 indicates the output channel data rate of the channel CH 4 by a solid line 94 on the graph 88, and indicates the expected output channel data rate of the channel CH4 by a dashed line 96. In this example, the output channel data rate of the channel CH 4 was 4 P/PS for a period of time and then dropped to 0 P/PS and then came back to 4 P/PS. The expected output channel data rate is 4 P/PS.

The graph 88 is user selectable, and the operator selects a location 98 on the graph 88 where the output channel data rate of the channel CH 4 is 4 P/PS. The controller 48 receives the user input selection and correlates the location 98 of the user input selection to a particular instant of time on the X-axis 90 of the graph 88. Referring now to FIG. 4B, the controller 48 accesses the historical data rate data store 56 and generates, based on the multicast data rate information in the historical data rate data store 56, user interface imagery 86-2. The user interface imagery 86-2 supplements the user interface imagery 86-1 and comprises information 100 that identifies the path through the routers 26 in the set of routers 26 from the source device 24-N to the receiver 28-2 and, for each respective router 26 in the set of routers 26, an incoming data rate 102 associated with the multicast address corresponding to the channel CH4 and an outgoing data rate 104 associated with the multicast address corresponding to the channel CH4 at the particular instant in time. At the particular instant in time, the incoming data rate 102 and outgoing data rate 104 was 4 P/PS and thus the outgoing channel data rate was equal to the expected channel data rate.

The operator next selects a location 106 on the graph 88 where the output channel data rate of the channel CH 4 is 0 P/PS. The controller 48 receives the user input selection and correlates the location 106 of the user input selection to a particular instant of time on the X-axis 90 of the graph 88. Referring now to FIG. 4C, the controller 48 accesses the historical data rate data store 56 and generates, based on the multicast data rate information in the historical data rate data store 56, user interface imagery 86-3. The user interface imagery 86-3 comprises information 108 that identifies the path through the routers 26 in the set of routers 26 from the source device 24-N to the receiver 28-2 and, for each respective router 26 in the set of routers 26, an incoming data rate 110 associated with the multicast address corresponding to the channel CH4 and an outgoing data rate 112 associated with the multicast address corresponding to the channel CH4 at the particular instant in time. At the particular instant in time, the router RD5 (i.e., the router 26-5) is no longer outputting packets addressed to the multicast address ADDR7 and thus at the at the router 26-7 and each subsequent router 26 in the path the output channel data rate of the channel CH 4 is 0 P/PS. The operator thus determines that although the channel CH4 is currently not having issues, previously the router 26-5 caused a transient issue by dropping all packets destined for the multicast address ADDR7 for a period of approximately 30 milliseconds.

Figure 5:
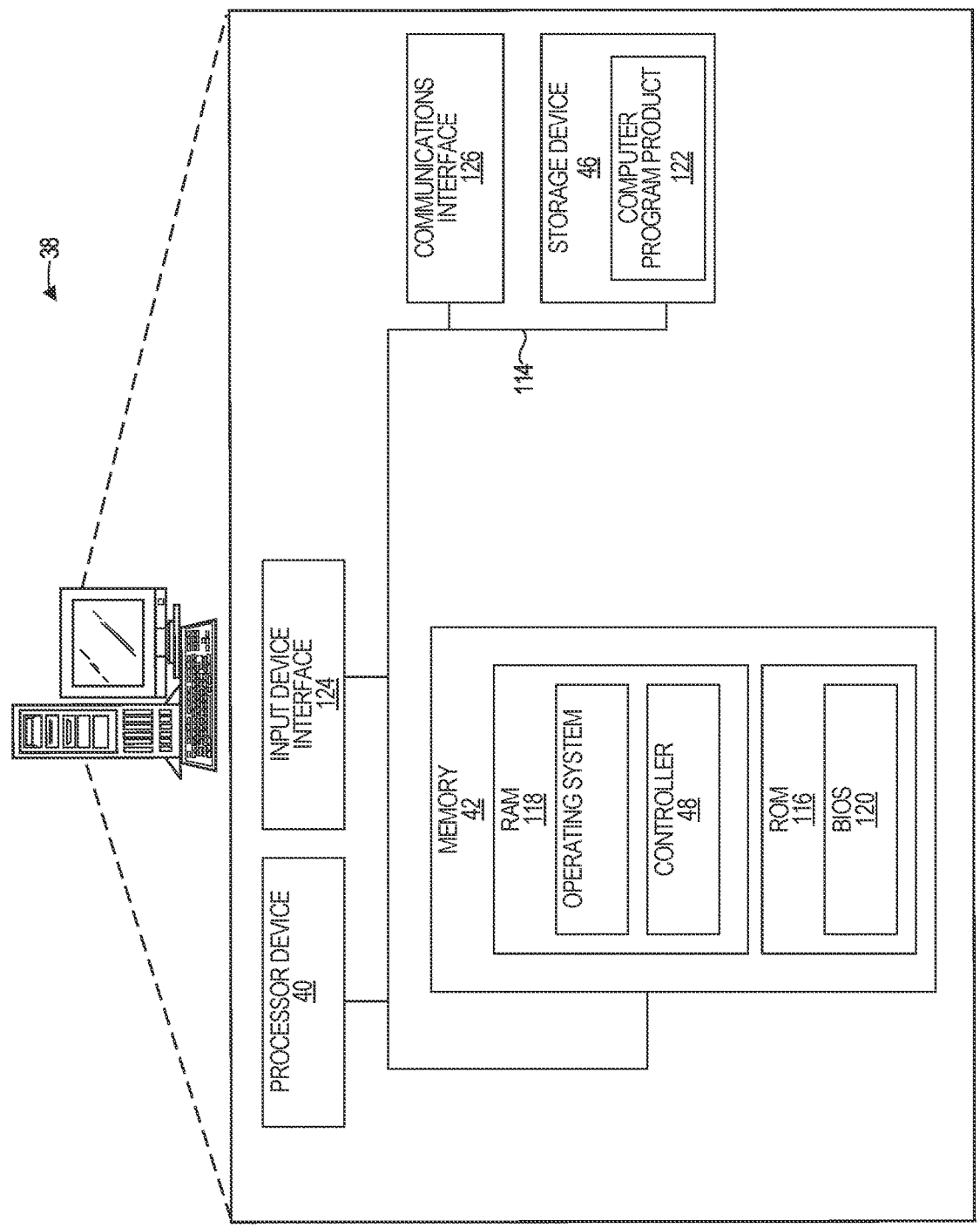
FIG. 5 is a block diagram of a computing device suitable for implementing embodiments disclosed herein.

FIG. 5 is a block diagram of the computing device 38 suitable for implementing examples according to one example. The computing device 38 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 38 includes the processor device 40, the system memory 42, and a system bus 114. The system bus 114 provides an interface for system components including, but not limited to, the system memory 42 and the processor device 40. The processor device 40 can be any commercially available or proprietary processor device.

The system bus 114 may be any of several types of bus structures that may further interconnect to a memory bus (with or without a memory controller), a peripheral bus, and/or a local bus using any of a variety of commercially available bus architectures. The system memory 42 may include non-volatile memory 116 (e.g., read-only memory (ROM), erasable programmable read-only memory (EPROM), electrically erasable programmable read-only memory (EEPROM), etc.), and volatile memory 118 (e.g., random-access memory (RAM)). A basic input/output system (BIOS) 120 may be stored in the non-volatile memory 116 and can include the basic routines that help to transfer information between elements within the computing device 38. The volatile memory 118 may also include a high-speed RAM, such as static RAM, for caching data.

The computing device 38 may further include or be coupled to a non-transitory computer-readable storage medium such as the storage device 46, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 46 and in the volatile memory 118, including an operating system and one or more program modules, such as the controller 48, which may implement the functionality described herein in whole or in part. All or a portion of the examples may be implemented as a computer program product 122 stored on a transitory or non-transitory computer-usable or computer-readable storage medium, such as the storage device 46, which includes complex programming instructions, such as complex computer-readable program code, to cause the processor device 40 to carry out the steps described herein. Thus, the computer-readable program code can comprise software instructions for implementing the functionality of the examples described herein when executed on the processor device 40. The processor device 40, in conjunction with the controller 48 in the volatile memory 118, may serve as a controller, or control system, for the computing device 38 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 40 through an input device interface 124 that is coupled to the system bus 114 but can be connected by other interfaces such as a parallel port, an Institute of Electrical and Electronic Engineers (IEEE) 1394 serial port, a Universal Serial Bus (USB) port, an IR interface, and the like. The computing device 38 may also include a communications interface 126 suitable for communicating with the devices in the service provider network 12.

Individuals will recognize improvements and modifications to the preferred examples of the disclosure. All such improvements and modifications are considered within the scope of the concepts disclosed herein and the claims that follow.

What is claimed is:

1. A method, comprising:
    accessing, by a computing device comprising a processor device, channel information that identifies a plurality of channels, and for each channel a multicast address to which packets carrying channel content are addressed;
    obtaining, by the computing device from a plurality of routers, multicast data rate information that identifies, for each respective router, a real-time data rate of data addressed to a multicast address being routed by the respective router;
    determining, by the computing device based on the multicast data rate information, that an output channel data rate of a first channel of the plurality of channels is lower than an expected output channel data rate that corresponds to the first channel; and
    presenting, on a display device, information indicating that the first channel has an output channel data rate that is less than the expected output channel data rate.

2. The method of claim 1 wherein the multicast data rate information comprises, for each respective router of the plurality of routers, a list of multicast addresses that are routed by the respective router, and for each multicast address in the list, an incoming data rate and an outgoing data rate.

3. The method of claim 1 further comprising:
    prior to presenting, on the display device, the information indicating that the first channel has the output channel data rate that is less than the expected output channel data rate:
        obtaining, for each respective channel of the plurality of channels, an expected output channel data rate;
        determining, for each respective channel, the an output channel data rate of the respective channel; and
        comparing, for each respective channel, the output channel data rate of the respective channel to the expected output channel data rate.

4. The method of claim 1 wherein presenting, on the display device, the information comprises:
    generating, by the computing device, first user interface imagery that comprises a plurality of channel controls, each channel control corresponding to one of the plurality of channels and comprising information that identifies the channel to which the channel control corresponds;
    altering a visual characteristic of a first channel control that corresponds to the first channel to have a different visual characteristic than that of each other channel control; and
    presenting, by the computing device, the first user interface imagery on the display device.

5. The method of claim 4 further comprising:
    receiving, by the computing device, a user input selection of the first channel control; and
    in response to receiving the user input selection, presenting, by the computing device on the display device, second user interface imagery that identifies the output channel data rate of the first channel and the expected output channel data rate of the first channel.

6. The method of claim 4 further comprising:
    receiving, by the computing device, a first user input selection of the first channel control;
    in response to receiving the first user input selection, determining, by the computing device, a path through a set of routers of the plurality of routers that a packet having a multicast address that corresponds to the first channel is routed from a source device to a receiver device;
    accessing, by the computing device from a historical data rate data store, multicast data rate information obtained iteratively over a period of time; and
    presenting, by the computing device based on the multicast data rate information obtained iteratively over the period of time, second user interface imagery that identifies the output channel data rate of the first channel at a plurality of instances in time.

7. The method of claim 6 wherein the second user interface imagery comprises a graph having an x-axis of time that encompasses the plurality of instances in time, and having a y-axis of data rate, and wherein the output channel data rate of the first channel is indicated by a first line on the graph.

8. The method of claim 7 further comprising:
    receiving, by the computing device, a second user input selection of the second user interface imagery;
    correlating, by the computing device, a location of the second user input selection to a particular instant of time on the X-axis of the graph;
    generating, by the computing device based on the multicast data rate information obtained iteratively over the period of time, third user interface imagery that identifies each router in the set of routers and, for each respective router in the set of routers, an incoming data rate associated with the multicast address and an outgoing data rate associated with the multicast address at the particular instant in time; and
    presenting, by the computing device on the display device, the third user interface imagery.

9. The method of claim 7 wherein the second user interface imagery further comprises a second line on the graph that indicates the expected output channel data rate of the first channel.

10. The method of claim 1 wherein presenting, on the display device, the information indicating that the first channel has the output channel data rate that is less than the expected output channel data rate comprises:
   determining, by the computing device, a path through a set of routers of the plurality of routers that a packet having a multicast address that corresponds to the first channel is routed from a source device to a receiver device;
   generating, by the computing device based on the multicast data rate information, user interface imagery that identifies each router in the set of routers and, for each respective router in the set of routers, an incoming data rate associated with the multicast address and an outgoing data rate associated with the multicast address; and
   presenting, by the computing device on the display device, the user interface imagery.

11. The method of claim 10 wherein the user interface imagery identifies the path through the set of routers from the source device to the receiver device.

12. The method of claim 1 wherein obtaining the multicast data rate information comprises:
   obtaining, by the computing device, the multicast data rate information iteratively over a period of time; and
   storing, by the computing device each iteration, the multicast data rate information and a time of obtaining the multicast data rate information in a historical data rate data store.

13. The method of claim 12 wherein obtaining, by the computing device, the multicast data rate information iteratively over the period of time comprises sending, by the computing device to each router of the plurality of routers, a request for the multicast data rate information iteratively over the period of time.

14. The method of claim 1 wherein presenting, on the display device, the information indicating that the first channel has the output channel data rate that is less than the expected output channel data rate comprises:
   accessing, by the computing device from a historical data rate data store, multicast data rate information obtained iteratively over a period of time; and
   presenting, by the computing device based on the multicast data rate information obtained iteratively over the period of time, a graph having an x-axis of time and having a y-axis of data rate, and wherein the output channel data rate of the first channel at a plurality of instances in time is indicated by a first line on the graph and the expected output channel data rate is indicated by a second line on the graph, and wherein the first line deviates from the second line at some location on the graph.

15. A computing device comprising:
   a memory; and
   a processor device coupled to the memory and configured to:
   access channel information that identifies a plurality of channels, and for each channel a multicast address to which packets carrying channel content are addressed;
   obtain, from a plurality of routers, multicast data rate information that identifies, for each respective router, a real-time data rate of data addressed to a multicast address being routed by the respective router;
   determine, based on the multicast data rate information, that an output channel data rate of a first channel of the plurality of channels is lower than an expected output channel data rate that corresponds to the first channel; and
   present, on a display device, information indicating that the first channel has an output channel data rate that is less than the expected output channel data rate.

16. The computing device of claim 15 wherein to present, on the display device, the information indicating that the first channel has the output channel data rate that is less than the expected output channel data rate, the processor device is further to:
   generate first user interface imagery that comprises a plurality of channel controls, each channel control corresponding to one of the plurality of channels and comprising information that identifies the channel to which the channel control corresponds;
   alter a visual characteristic of a first channel control that corresponds to the first channel to have a different visual characteristic than that of each other channel control; and
   present the first user interface imagery on the display device.

17. The computing device of claim 15 wherein to present, on the display device, the information indicating that the first channel has the output channel data rate that is less than the expected output channel data rate, the processor device is further to:
   determine a path through a set of routers of the plurality of routers that a packet having a multicast address that corresponds to the first channel is routed from a source device to a receiver device;
   generate, based on the multicast data rate information, user interface imagery that identifies each router in the set of routers and, for each respective router in the set of routers, an incoming data rate associated with the multicast address and an outgoing data rate associated with the multicast address; and
   present, on the display device, the user interface imagery.

18. A non-transitory computer-readable storage medium that includes executable instructions configured to cause a processor device to:
   access channel information that identifies a plurality of channels, and for each channel a multicast address to which packets carrying channel content are addressed;
   obtain, from a plurality of routers, multicast data rate information that identifies, for each respective router, a real-time data rate of data addressed to a multicast address being routed by the respective router;
   determine, based on the multicast data rate information, that an output channel data rate of a first channel of the plurality of channels is lower than an expected output channel data rate that corresponds to the first channel; and
   present, on a display device, information indicating that the first channel has an output channel data rate that is less than the expected output channel data rate.

19. The non-transitory computer-readable storage medium of claim 18 wherein to present, on the display device, the information indicating that the first channel has an output channel data rate that is less than the expected output channel data rate, the instructions further cause the processor device to:

generate first user interface imagery that comprises a plurality of channel controls, each channel control corresponding to one of the plurality of channels and comprising information that identifies the channel to which the channel control corresponds;

alter a visual characteristic of a first channel control that corresponds to the first channel to have a different visual characteristic than that of each other channel control; and present the first user interface imagery on the display device.

20. The non-transitory computer-readable storage medium of claim 18 wherein to present, on the display device, the information indicating that the first channel has the output channel data rate that is less than the expected output channel data rate, the instructions further cause processor device is further to:

determine a path through a set of routers of the plurality of routers that a packet having a multicast address that corresponds to the first channel is routed from a source device to a receiver device;

generate, based on the multicast data rate information, user interface imagery that identifies each router in the set of routers and, for each respective router in the set of routers, an incoming data rate associated with the multicast address and an outgoing data rate associated with the multicast address; and present, on the display device, the user interface imagery.

* * * * *